United States Patent
Ohwaku

(10) Patent No.: US 10,412,241 B2
(45) Date of Patent: Sep. 10, 2019

(54) DOCUMENT READING APPARATUS

(71) Applicant: SHARP KABUSHIKI KAISHA, Sakai, Osaka (JP)

(72) Inventor: Takeshi Ohwaku, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/215,184

(22) Filed: Dec. 10, 2018

(65) Prior Publication Data
US 2019/0182389 A1 Jun. 13, 2019

(30) Foreign Application Priority Data
Dec. 13, 2017 (JP) .................................. 2017-238888

(51) Int. Cl.
H04N 1/00 (2006.01)

(52) U.S. Cl.
CPC ....... H04N 1/0044 (2013.01); H04N 1/00037 (2013.01); H04N 1/00785 (2013.01)

(58) Field of Classification Search
CPC ............. H04N 1/0044; H04N 1/00785; H04N 1/00037
USPC ...................................................... 358/1.15
See application file for complete search history.

(56) References Cited

U.S. PATENT DOCUMENTS

| | | | | |
|---|---|---|---|---|
| 6,532,349 | B1* | 3/2003 | Todome | G03G 15/5016 399/377 |
| 2009/0190152 | A1* | 7/2009 | Takatani | H04N 1/00347 358/1.13 |
| 2012/0019863 | A1* | 1/2012 | Sensu | H04N 1/0044 358/1.15 |
| 2017/0357623 | A1* | 12/2017 | MacLean | G06F 17/212 |

FOREIGN PATENT DOCUMENTS

JP    2003-338920 A    11/2003

* cited by examiner

*Primary Examiner* — Allen H Nguyen
(74) *Attorney, Agent, or Firm* — ScienBiziP, P.C.

(57) ABSTRACT

In a document reading apparatus including a document reading unit that reads a document, an image generation unit that generates a preview image based on document read information acquired by the document reading unit, and a display unit that can display the preview image, the document reading unit has a function to read a plurality of documents by one time reading operation and acquires first document read information obtained by reading the document in a state where a document pressing member is opened and second document read information obtained by reading the document in a state where the document pressing member is closed for each document, and the image generation unit generates a preview image corresponding to each document based on the first document read information and the second document read information.

11 Claims, 17 Drawing Sheets

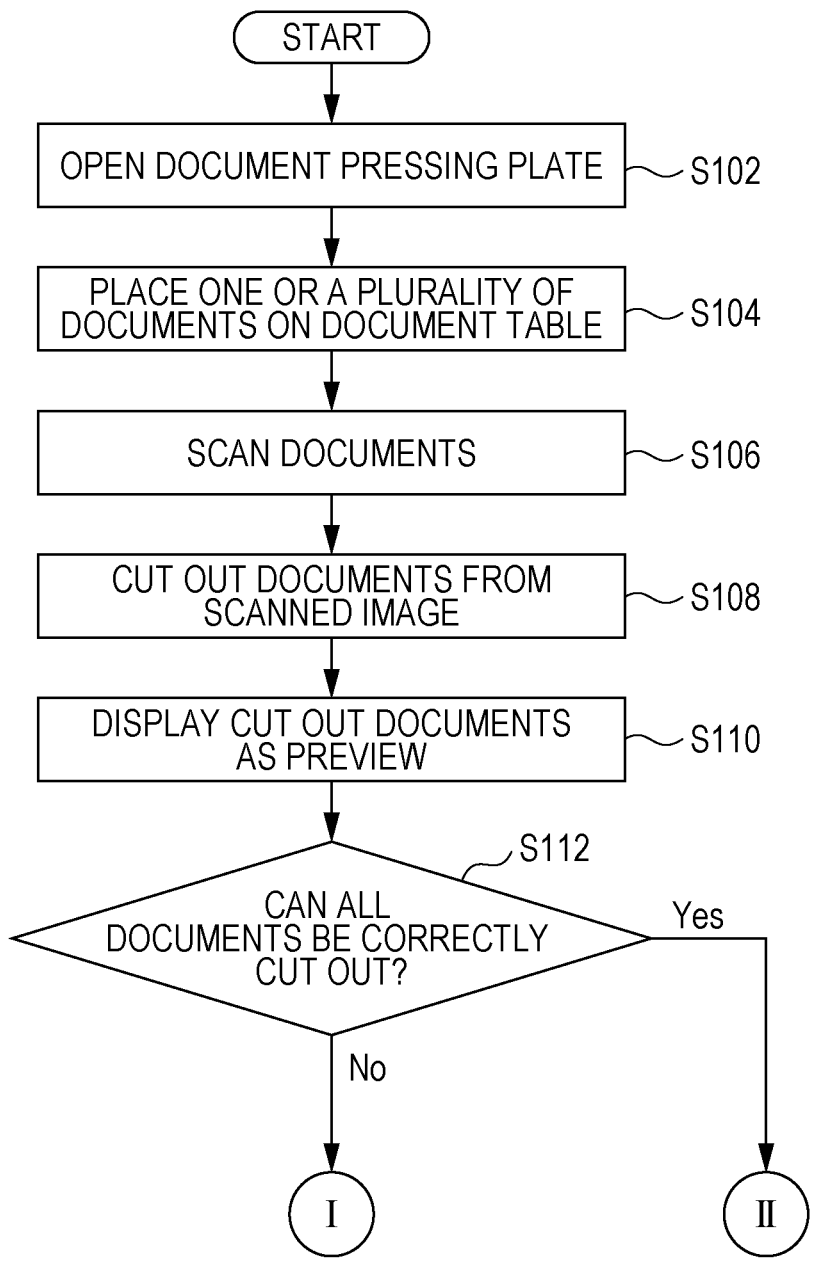

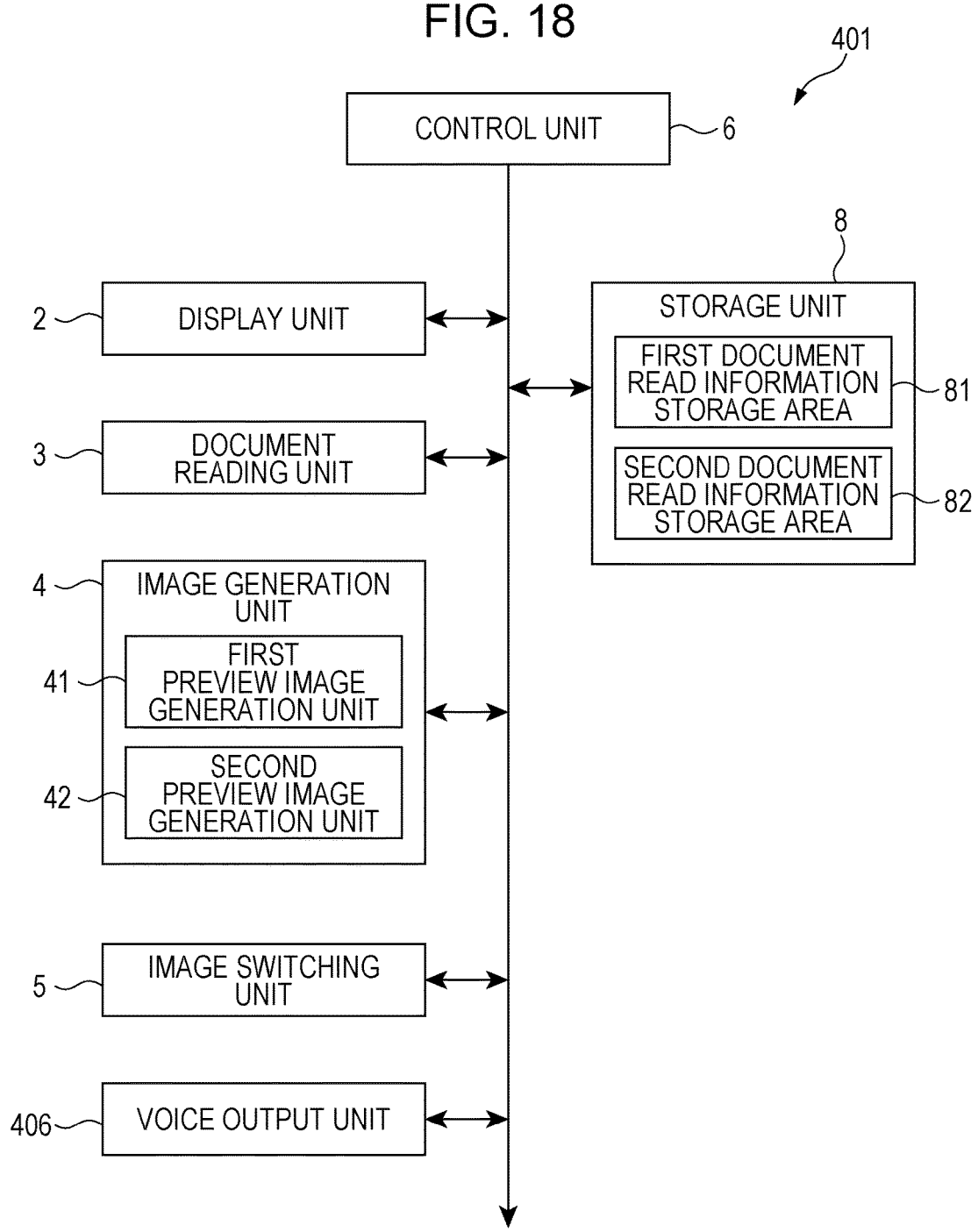

DOCUMENT READING APPARATUS

BACKGROUND

1. Field

The present disclosure relates to a document reading apparatus, and in particular to a document reading apparatus that can display a preview image of a read document.

2. Description of the Related Art

As a conventional technique, a technique is known that can display a preview image of a read document on a display unit and check document contents in a document reading apparatus.

In recent years, a so-called multi-crop technique is known where in a document reading apparatus, when a plurality of documents are set on a document table, positions and sizes of the plurality of documents are automatically detected and each document is cut out.

However, when the plurality of documents are cut out, document areas are automatically cut out by using density differences between a document table cover (white) and document areas, so that there is a problem that a white document cannot be successfully cut out.

Therefore, to solve the above problem, as a conventional technique, for example, a technique is disclosed that makes a white document to be easily identified by reading documents after covering the document table with a black sheet (see Japanese Unexamined Patent Application Publication No. 2003-338920).

However, in the technique proposed in Japanese Unexamined Patent Application Publication No. 2003-338920, there is a problem that when a blackish document is set on the document table in the document reading apparatus, the document cannot be identified. Further, a black sheet is required to be prepared when functioning the multi-crop, so that there is a problem that an document reading operation becomes complicated.

It is desirable to provide a document reading apparatus that can accurately identify documents without performing a complicated operation.

SUMMARY

According to an aspect of the disclosure, there is provided a document reading apparatus including a document reading unit that reads a document, an image generation unit that generates a preview image based on document read information acquired by the document reading unit, and a display unit that can display the preview image. The document reading unit has a function (multi-crop function) to read a plurality of documents by one time reading operation and acquires first document read information obtained by reading the document in a state where a document pressing member is opened and second document read information obtained by reading the document in a state where the document pressing member is closed for each document, and the image generation unit generates a preview image corresponding to each document based on the first document read information and the second document read information.

BRIEF DESCRIPTION OF THE DRAWINGS

FIG. 5 is a flowchart showing an example of processing where the document reading apparatus reads a plurality of documents;

FIG. 18 is a block diagram showing a configuration of a document reading apparatus according to a fourth embodiment.

DESCRIPTION OF THE EMBODIMENTS

First Embodiment

Hereinafter, a first embodiment of the present disclosure will be described with reference to the drawings.

Figure 1:
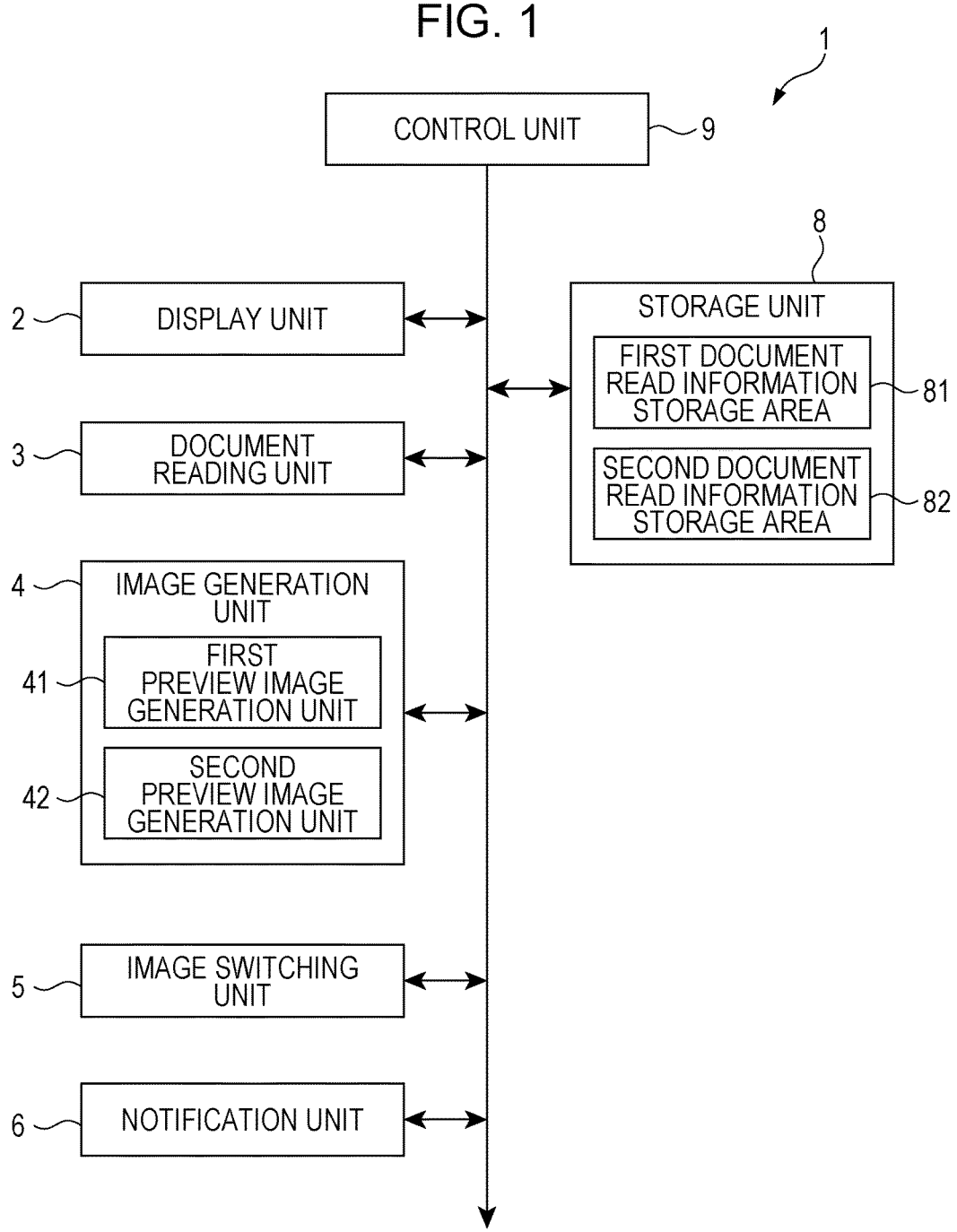
FIG. 1 is a block diagram showing a configuration of a document reading apparatus according to a first embodiment.
Figure 2:
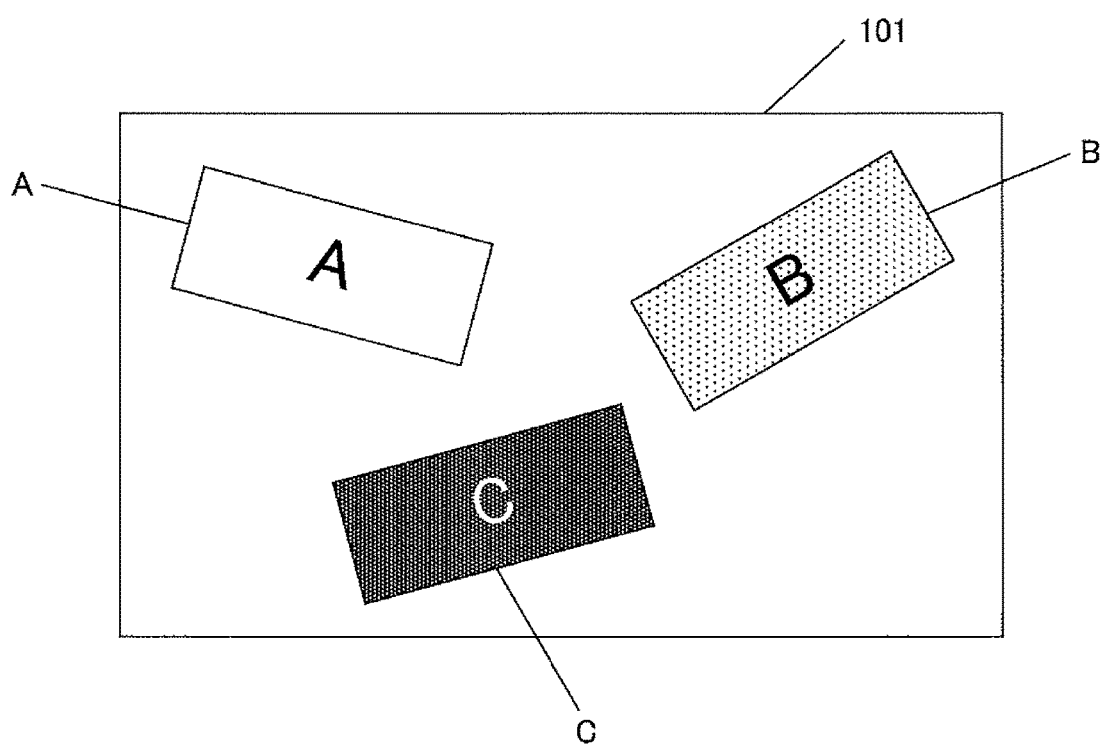
FIG. 2 is an explanatory diagram showing a state where a plurality of documents are arranged on a document table of the document reading apparatus.
Figure 3A:
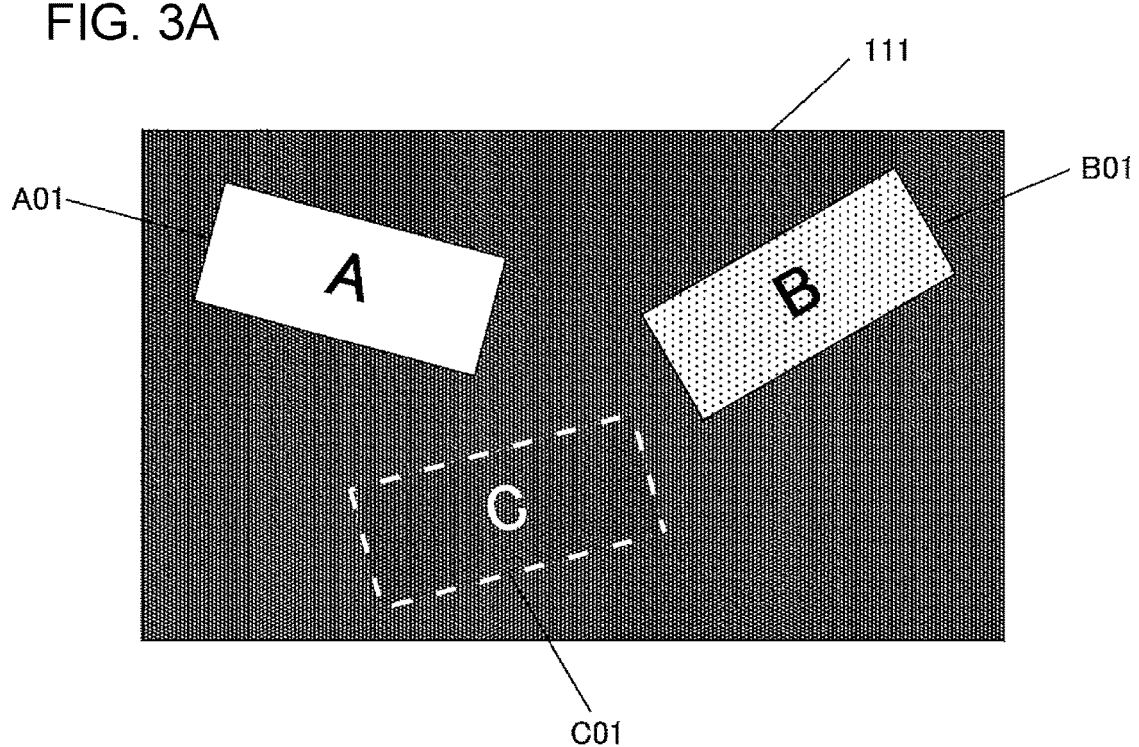
FIG. 3A is an explanatory diagram showing a scanned image obtained by scanning documents in a state where a document pressing plate of the document reading apparatus is opened.
Figure 3B:
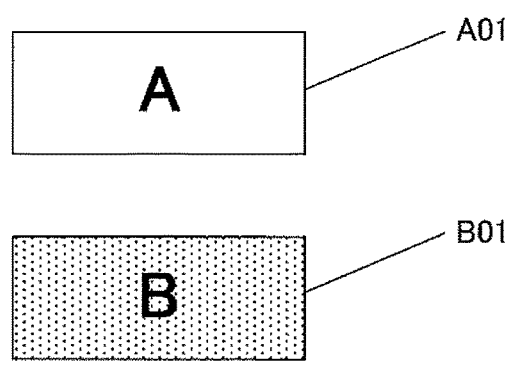
FIG. 3B is an explanatory diagram showing identifiable scanned images.
Figure 4A:
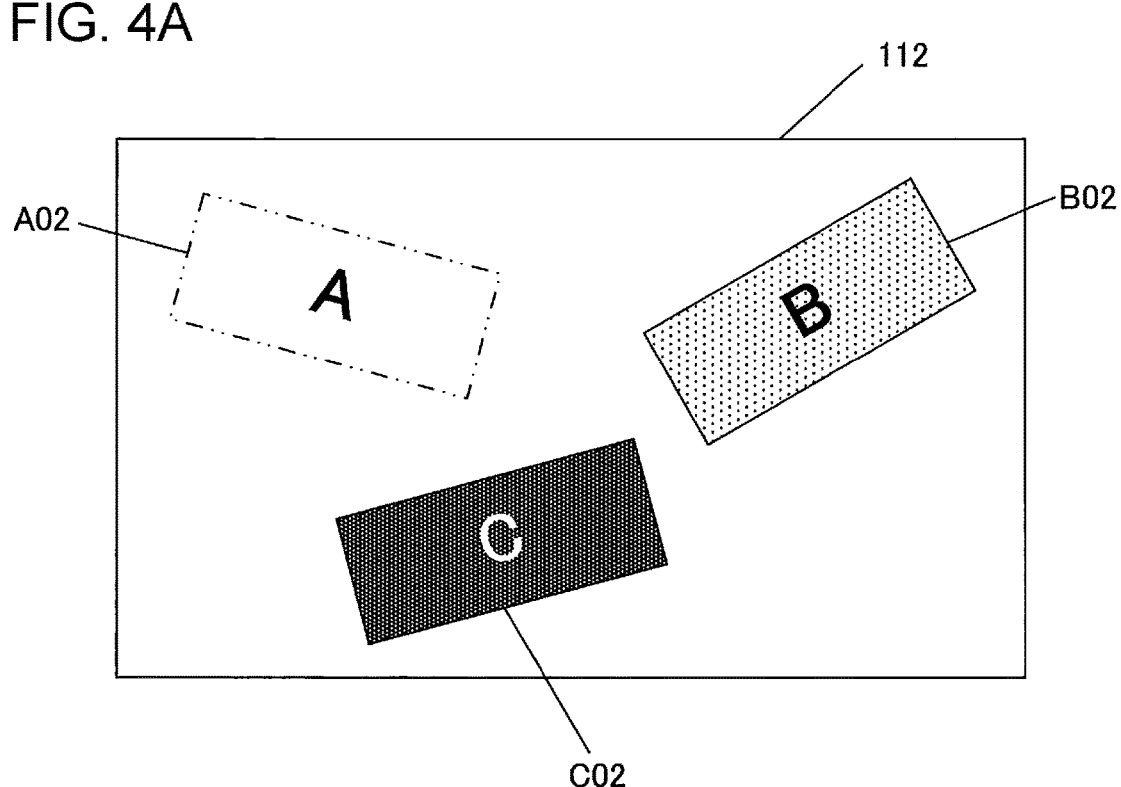
FIG. 4A is an explanatory diagram showing a scanned image obtained by scanning documents in a state where the document pressing plate of the document reading apparatus is closed.
Figure 4B:
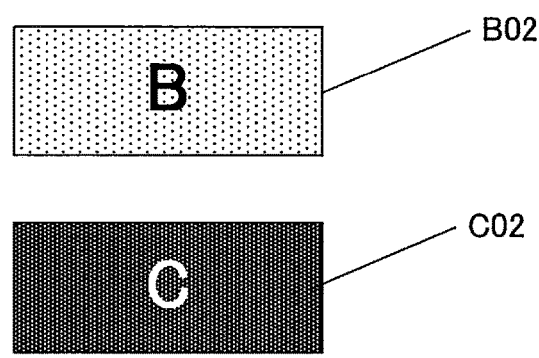
FIG. 4B is an explanatory diagram showing identifiable scanned images.

FIG. 1 is a block diagram showing a configuration of a document reading apparatus according to a first embodiment which is an example of an embodiment of the present disclosure. FIG. 2 is an explanatory diagram showing a state where a plurality of documents are arranged on a document table of the document reading apparatus. FIG. 3A is an explanatory diagram showing a scanned image obtained by scanning documents in a state where a document pressing plate of the document reading apparatus is opened. FIG. 3B is an explanatory diagram showing identifiable scanned images. FIG. 4A is an explanatory diagram showing a scanned image obtained by scanning documents in a state where the document pressing plate of the document reading apparatus is closed. FIG. 4B is an explanatory diagram showing identifiable scanned images.

(Entire Configuration)

As shown in FIG. 1, the document reading apparatus 1 according to the first embodiment is configured to includes mainly a display unit 2, a document reading unit 3, an image generation unit 4, an image switching unit 5, a notification unit 6, a storage unit 8, and a control unit 9.

On the display unit 2, a preview image showing a reading state of a read document is displayed.

The document reading unit 3 has a function (multi-crop function) to read a plurality of documents by one time reading operation and is characterized by acquiring first document read information where a plurality of documents are read in a state where a document pressing plate (document pressing member) is opened and second document read information where a plurality of documents are read in a state where the document pressing plate (document pressing member) is closed for each document.

The image generation unit 4 is characterized by including a first preview image generation unit 41 and a second preview image generation unit 42 which generate a preview image (that identifies an image) corresponding to each document based on the first document read information and the second document read information read by the document reading unit 3.

The storage unit 8 includes a first document read information storage area 81 and a second document read information storage area 82 which store the first document read information and the second document read information read by the document reading unit 3.

When a document cannot be read, the notification unit 6 displays a message or the like indicating that the document cannot be read on the display unit 2.

The control unit 9 performs operation control of each unit of the document reading apparatus 1 according to an instruction to read a document.

(Reading of Document by Document Reading Apparatus)

Next, a state of reading a document by the document reading apparatus 1 will be described with reference to drawings.

In the first embodiment, as shown in FIG. 2, a document A, a document B, and a document C, which have similar shapes, are arranged on a document table 101 of the document reading apparatus 1. The document A is made of whitish document paper, the document B is made of gray document paper, and the document C is made of blackish document paper.

First, when the documents are read a state where the document pressing plate is opened, as shown in FIG. 3A, a background 111 of the scanned image is black because scanning light is not reflected.

When each of the documents A, B, and C is read in this state, a scanned image A01 of the document A can be clearly identified from the black background 111 because the document is white. A scanned image B01 of the document B can be identified from the black background 111 because the document is gray. A scanned image C01 of the document C is difficult to be identified from the black background 111 because the scanned image C01 is blackish.

As a result, when the documents are read in a state where the document pressing plate is opened, as shown in FIG. 3B, the scanned images A01 and B01 of the documents A and B can be identified from the background 111.

On the other hand, when the documents are read in a state where the document pressing plate is closed, as shown in FIG. 4A, a background 112 of the scanned image is white because the document pressing plate is normally white.

When each of the documents A, B, and C is read in this state, a scanned image A02 of the document A is difficult to be identified from the white background 112 because the scanned image A02 is white. A scanned image B02 of the document B can be identified from the white background 112 because the scanned image B02 is gray. A scanned image C02 of the document C can be clearly identified from the white background 112 because the document is blackish.

As a result, when the documents are read in a state where the document pressing plate is closed, as shown in FIG. 4B, the scanned images B02 and C02 of the documents B and C can be identified from the background 112.

As described above, when the documents are read in a state where the document pressing plate is opened, the scanned images A01 and B01 become easy to be identified, and when the documents are read in a state where the document pressing plate is closed, the scanned images B02 and C02 become easy to be identified. In this way, even when a whitish document and a blackish document are read at the same time, each document can be accurately identified by using one of the document reading results described above.

(Document Reading Processing Process)

Next, processing where the document reading apparatus 1 of the first embodiment reads and identifies a plurality of documents will be described with reference to a flowchart.

Figure 6:
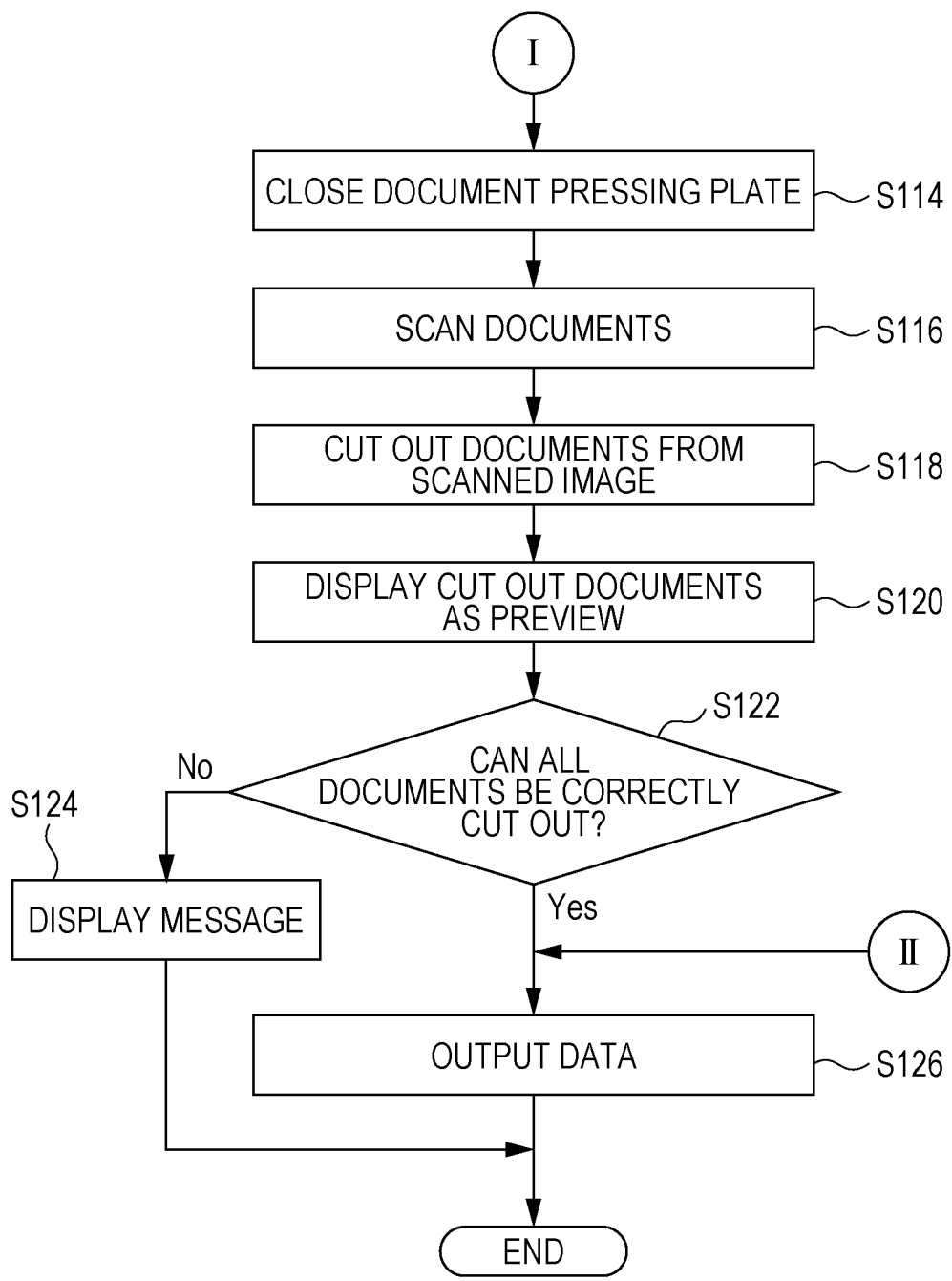
FIG. 6 is a flowchart following FIG. 5.

FIG. 5 is a flowchart showing an example of processing where the document reading apparatus of the first embodiment reads a plurality of documents. FIG. 6 is a flowchart following FIG. 5.

When the document reading apparatus 1 reads one or a plurality of documents, as shown in FIG. 5, the document pressing plate is opened (step S102), and one or a plurality of documents are arranged on the document table (step S104).

Then, the documents are read in a state where the document pressing member is still opened (step S106), a scanned image (document read information) is cut out for each document from a scanned image of the documents (step S108), and a preview image is generated from cut out scanned images and a preview display is performed (step S110).

Then, it is determined whether or not all the documents are correctly cut out (step S112). When it is determined that all the documents are correctly cut out, as shown in FIG. 6, data is outputted (step S126), and document reading processing is completed.

On the other hand, when it is determined that all the documents are not correctly cut out in step S112, as shown in FIG. 6, the document pressing plate is placed in a closed state (step S114), and the documents are read again (step S116). A scanned image (document read information) is cut out for each document from a scanned image of the documents (step S118), and a preview image is generated from cut out scanned images and a preview display is performed (step S120).

Then, it is determined whether or not all the documents are correctly cut out (step S122). When it is determined that all the documents are correctly cut out, data is outputted (step S126), and the document reading processing is completed.

On the other hand, when it is determined that all the documents are not correctly cut out in step S122, a message indicating that all the documents are not scanned is displayed on the display unit (step S124), and the document reading processing is completed.

(Display of Preview Image)

Next, a case where the document reading apparatus 1 reads a plurality of documents (documents A, B, and C) by using the multi-crop function will be described.

Figure 7:
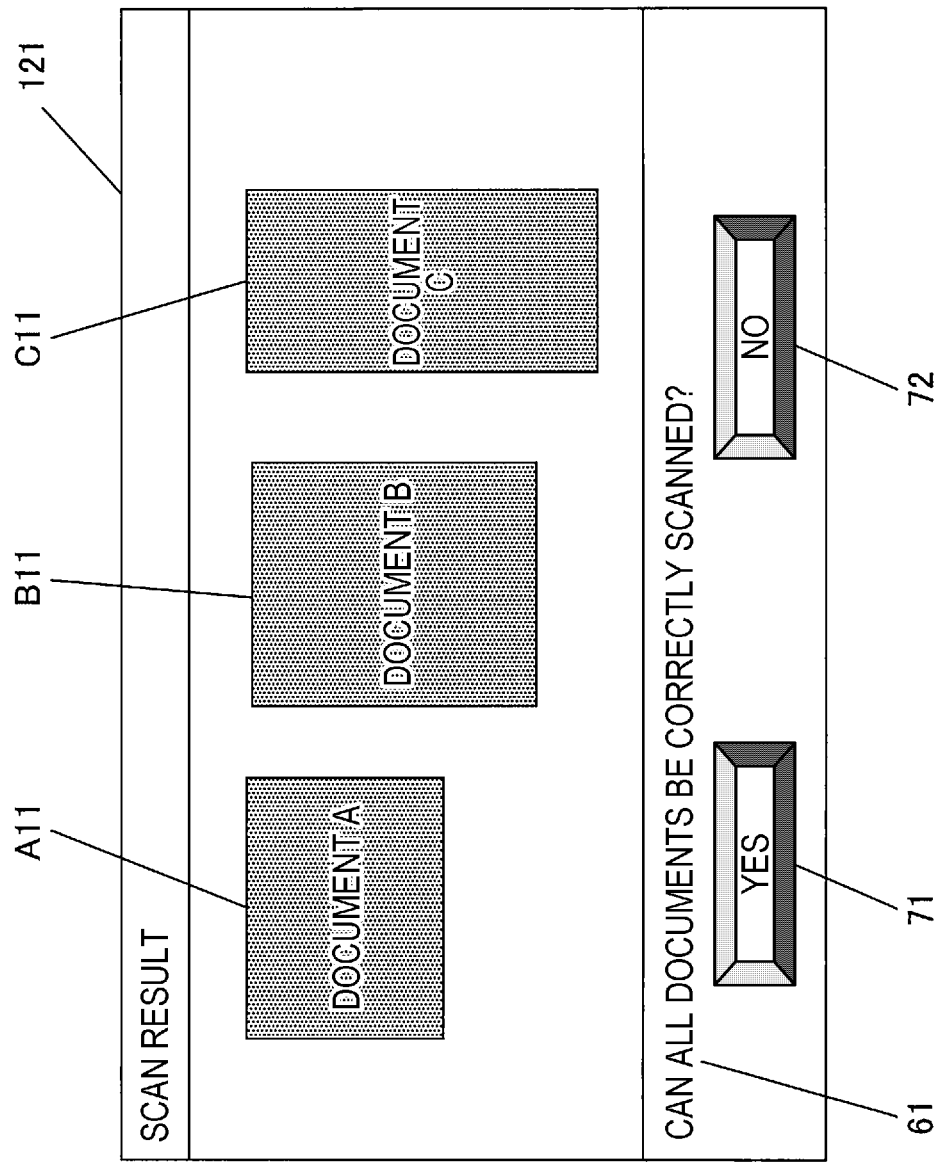
FIG. 7 is an explanatory diagram showing an example of a display screen displaying a document reading result in a state where the document pressing plate is opened in the document reading apparatus.
Figure 8:
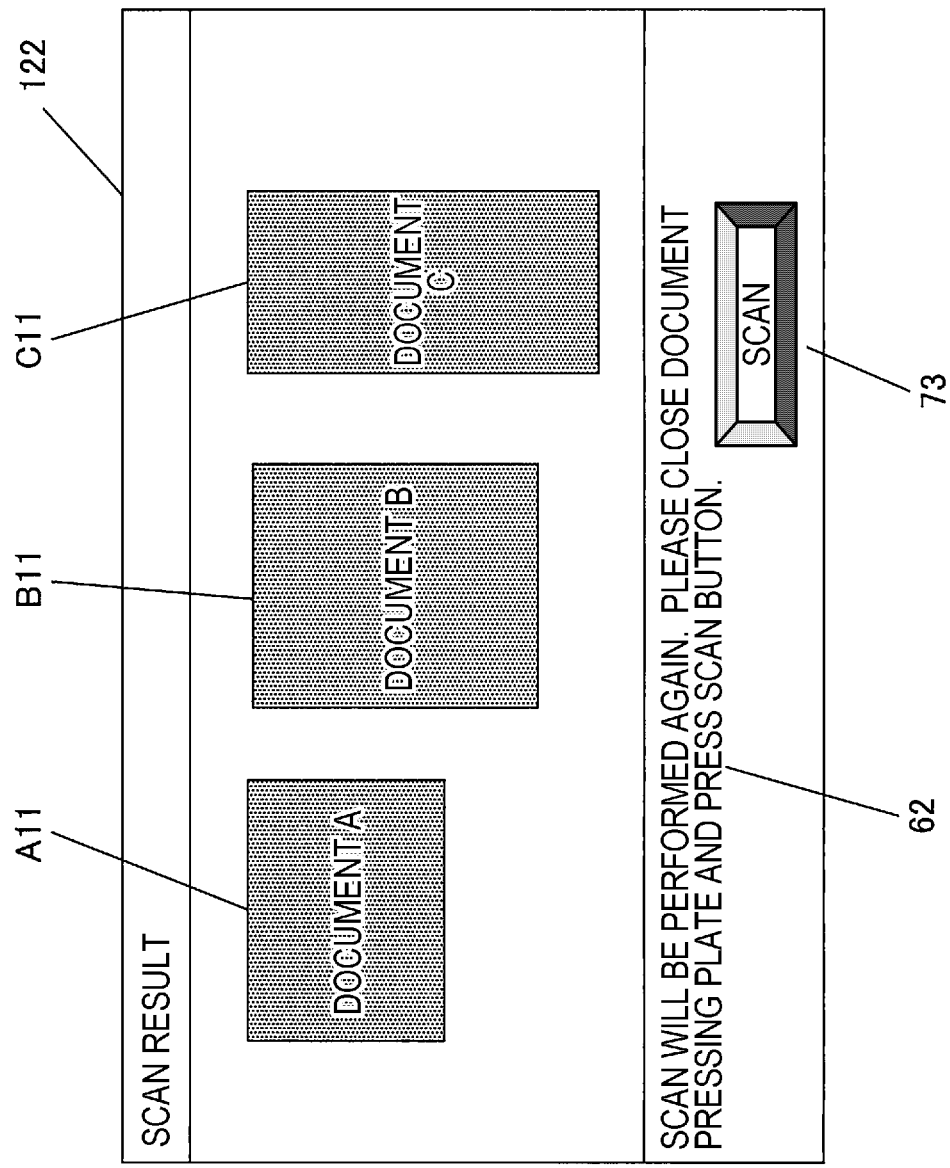
FIG. 8 is an explanatory diagram showing a state where the display screen is switched.
Figure 9:
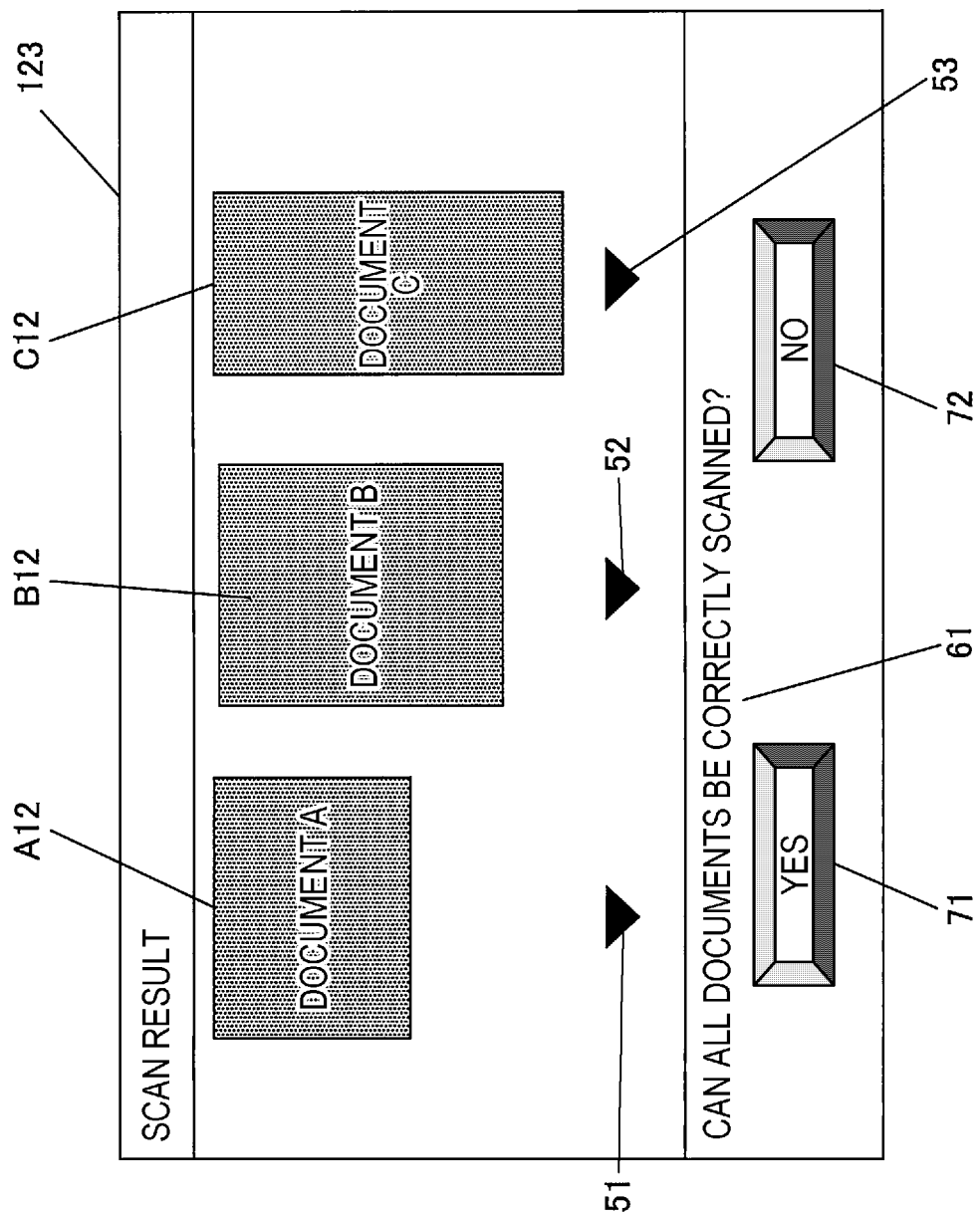
FIG. 9 is an explanatory diagram showing an example of a display screen displaying a document reading result in a state where the document pressing plate is closed in the document reading apparatus.
Figure 10:
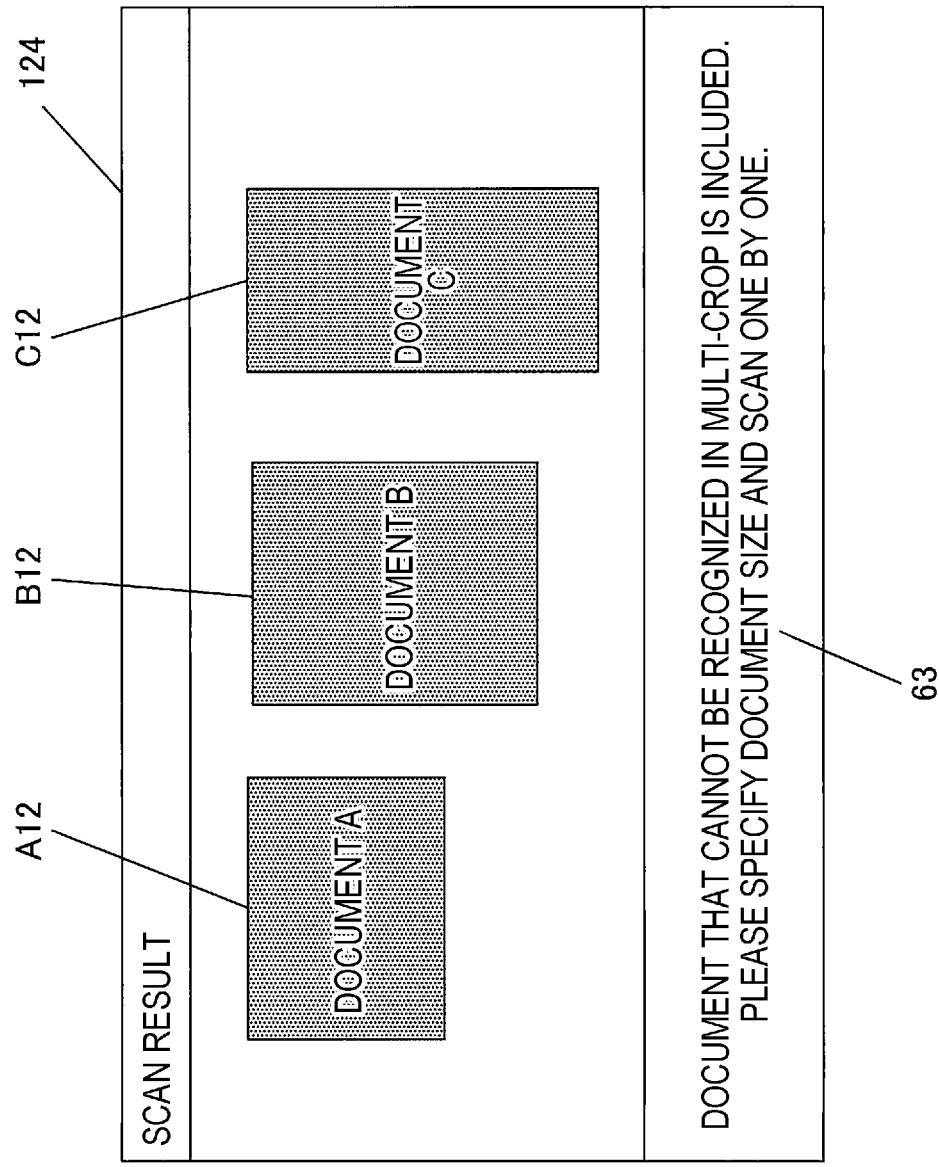
FIG. 10 is an explanatory diagram showing a state where the display screen is switched.

FIG. 7 is an explanatory diagram showing an example of a display screen displaying a document reading result in a state where the document pressing plate is opened in the document reading apparatus of the first embodiment. FIG. 8 is an explanatory diagram showing a state where the display screen is switched. FIG. 9 is an explanatory diagram showing an example of a display screen displaying a document reading result in a state where the document pressing plate is closed in the document reading apparatus. FIG. 10 is an explanatory diagram showing a state where the display screen is switched.

When the document reading apparatus 1 reads a plurality of documents by using the multi-crop function, first, the documents are arranged on the document table and the documents are read in a state where the document pressing plate is opened. When the documents are read, as shown in FIG. 7, a display screen 121 is displayed where first preview images of the documents read for the first time is displayed. The preview image may be an image corresponding to a scanned image.

On the display screen 121, the first preview images A11, B11, and C11 respectively corresponding to the documents A, B, and C that are read for the first time are displayed. Further, for example, a message 61 for checking the scanning state, for example, "Are all documents correctly scanned?", is displayed. Further, selection buttons 71 and 72 for checking the scanning state are displayed.

Here, when all the documents are not correctly scanned, by touching the selection button 72, the display screen 121 is switched to a display screen 122 to proceed to the next processing as shown in FIG. 8.

On the display screen 122, the first preview images A11, B11, and C11 respectively corresponding to the documents A, B, and C that are read for the first time are displayed, and a message 62 urging a scan operation, for example, "Scan will be performed again. Please close document pressing plate and press scan button." is displayed. Further, a scan button 73 for starting scan is displayed.

Next, the documents are read in a state where the document pressing plate of the document reading apparatus 1 is opened.

When the documents are read, as shown in FIG. 9, a display screen 123 is displayed where a preview image of the documents read for the second time is displayed.

On the display screen 123, second preview images A12, B12, and C12 respectively corresponding to the documents A, B, and C that are read for the second time are displayed. Further, for example, a message 61 for checking the scanning state, for example, "Are all documents correctly scanned?", is displayed. Further, the selection buttons 71 and 72 for checking the scanning state are displayed. In addition, switching buttons 51, 52, and 53 are displayed that switch the preview images and display the previous preview images for the documents A, B, and C, respectively.

Here, when all the documents are not correctly scanned, by touching the selection button 72, the display screen 123 is switched to a display screen 124 as shown in FIG. 10.

On the display screen 124, the second preview images A12, B12, and C12 respectively corresponding to the documents A, B, and C that are read for the second time are displayed, and a message 63 explaining a user of a scan operation, for example, "Document that cannot be recognized in multi-crop is included. Please specify document size and scan one by one." is displayed.

In this way, when documents cannot be read even by the two times document reading using the multi-crop function, it is possible to surely read a plurality of documents by recommending another document reading method.

(About Association Between Read Documents and Preview Images)

Next, an association between documents to be read and preview images corresponding to the documents in the document reading apparatus 1 will be described.

Figure 11A:
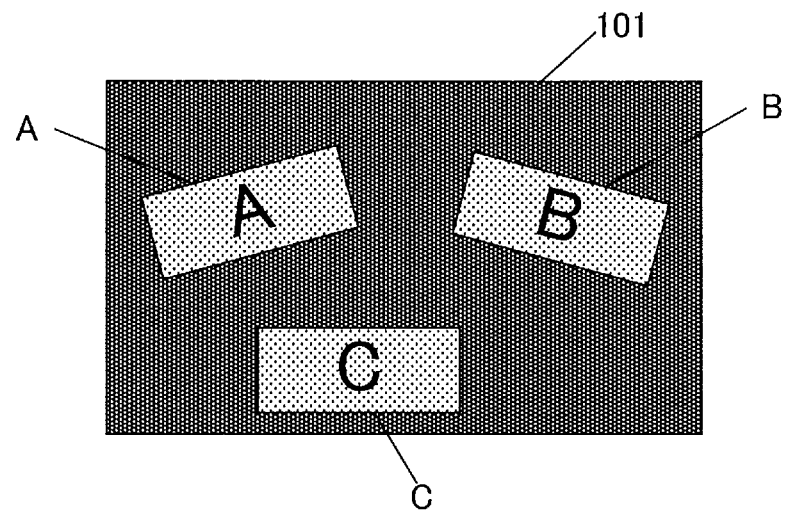
FIG. 11A is an explanatory diagram showing positions of documents A, B, and C when the documents A, B, and C are scanned (for the first time) in a state where the document pressing plate is opened in the document reading apparatus.
Figure 11B:
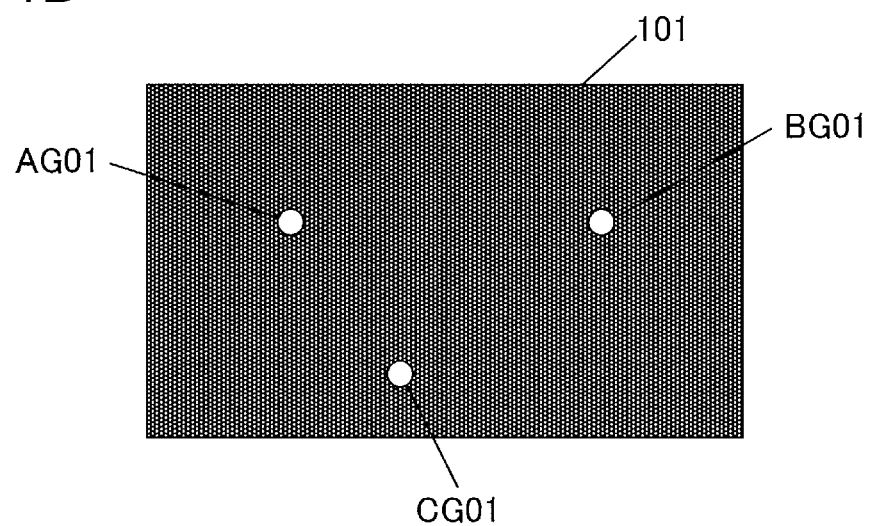
FIG. 11B is an explanatory diagram showing gravity center positions of the documents A, B, and C.
Figure 12A:
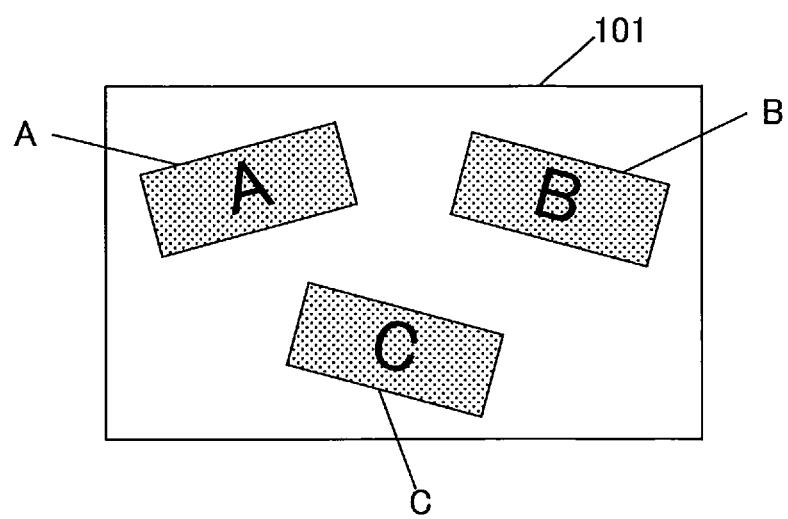
FIG. 12A is an explanatory diagram showing positions of documents A, B, and C when the documents A, B, and C are scanned (for the second time) in a state where the document pressing plate is closed in the document reading apparatus.
Figure 12B:
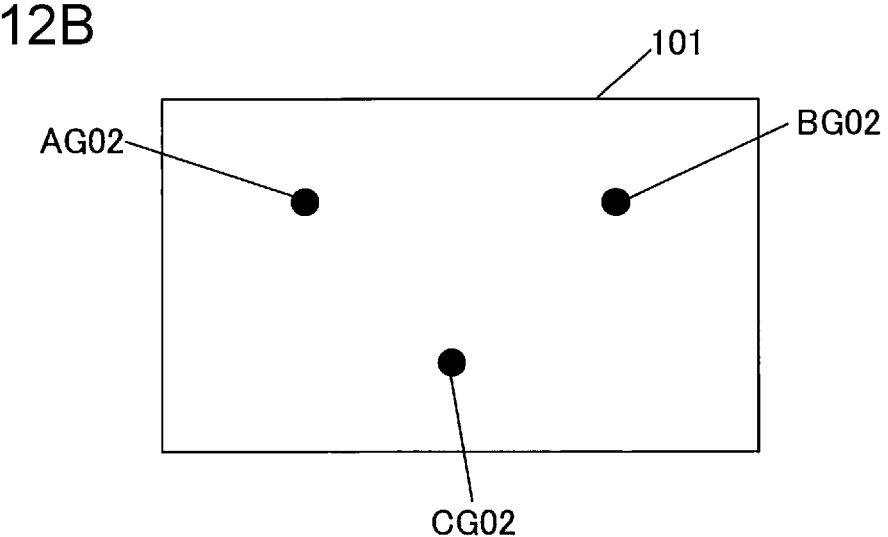
FIG. 12B is an explanatory diagram showing gravity center positions of the documents A, B, and C.
Figure 13:
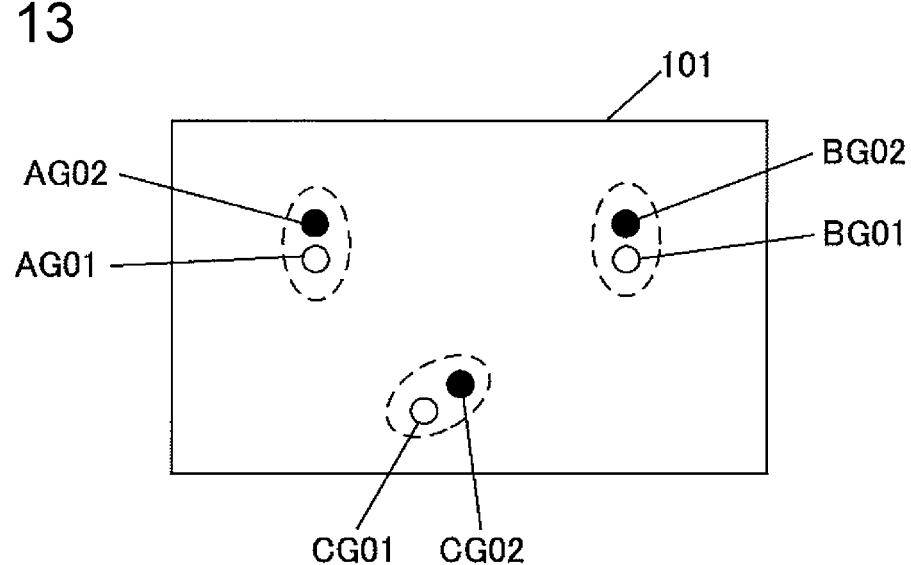
FIG. 13 is an explanatory diagram showing a state where the gravity center positions of the documents A, B, and C scanned in the document reading apparatus for the first and the second times are associated with each other.

FIG. 11A is an explanatory diagram showing positions of documents A, B, and C when the documents A, B, and C are scanned (for the first time) in a state where the document pressing plate is opened in the document reading apparatus of the first embodiment. FIG. 11B is an explanatory diagram showing gravity center positions of the documents A, B, and C. FIG. 12A is an explanatory diagram showing positions of documents A, B, and C when the documents A, B, and C are scanned (for the second time) in a state where the document pressing plate is closed in the document reading apparatus. FIG. 12B is an explanatory diagram showing gravity center positions of the documents A, B, and C. FIG. 13 is an explanatory diagram showing a state where the gravity center positions of the documents A, B, and C scanned in the document reading apparatus for the first and the second times are associated with each other.

As a characteristic configuration, regarding the association between a plurality of documents and preview images corresponding to each document, the document reading apparatus 1 of the first embodiment associates the first document read information obtained by reading a document in a state where the document pressing plate is closed with the second document read information obtained by reading the document in a state where the document pressing plate is opened for each document and identifies a preview image corresponding to the document based on the first document read information and the second document read information.

Here, the document reading in the state where the document pressing plate is closed is defined as "first time" document reading, and the document reading in the state where the document pressing plate is opened is defined as "second time" document reading.

The first embodiment is characterized by associating the first document read information with the second document read information for each document based on document set position information. The document set position information is a gravity center position of the document.

In the first time document reading where the documents A, B, and C are arranged on the document table 101 as shown in FIG. 11A, the gravity center positions of the documents A, B, and C are gravity center positions AG01, BG01, and CG01 as shown in FIG. 11B.

In the second time document reading where the documents A, B, and C are arranged on the document table 101 as shown in FIG. 12A, the gravity center positions of the documents A, B, and C are gravity center positions AG02, BG02, and CG02 as shown in FIG. 12B.

In the first embodiment, as shown in FIG. 13, the first time gravity positions and the second time gravity positions of the documents A, B, and C are compared with each other, and the documents, the distance between which is smallest, are associated with each other as the same document. Thereby, a first document read image and a second document read image for each document in the first time and the second time document readings can be associated with each other, so that it is possible to identify a preview image where the first document read image and the second document read image are associated with each other for each document.

As configured as described above, according to the first embodiment, in the document reading apparatus 1, a function to read a plurality of documents by one time reading operation is included as the document reading unit 3, the document reading unit 3 acquires the first document read information obtained by reading a document in a state where the document pressing plate is opened and the second document read information obtained by reading the document in a state where the document pressing plate is closed for each document, the first preview image generation unit 41 and the second preview image generation unit 42 is included as the image generation unit 4, and the image generation unit 4 generates a first preview image and a second preview image based on the first document read information and the second document read information and generates a preview image identifying an image for each document, so that even when reading a whitish document and a blackish document at the same time, it is possible to accurately identify each document by comparing preview images based on both document read results.

Further, the first embodiment includes the notification unit 6, so that when the document reading unit 3 cannot read a document, the notification unit 6 displays a message indicating that the document cannot be read on the display unit 2. Therefore, a user can easily check a document reading state.

Further, in the first embodiment, the switching buttons 51, 52, and 53 that switch and display the previous preview images for the documents A, B, and C, respectively, are provided on the display screen 123, so that it is possible to easily check the document reading state by switching and displaying the preview images for the documents A, B, and C, respectively.

Second Embodiment

Next, a second embodiment will be described with reference to the drawings.

For convenience of description, components having the same functions as those in the first embodiment are denoted by the same reference numerals and the description thereof will be omitted.

Figure 14:
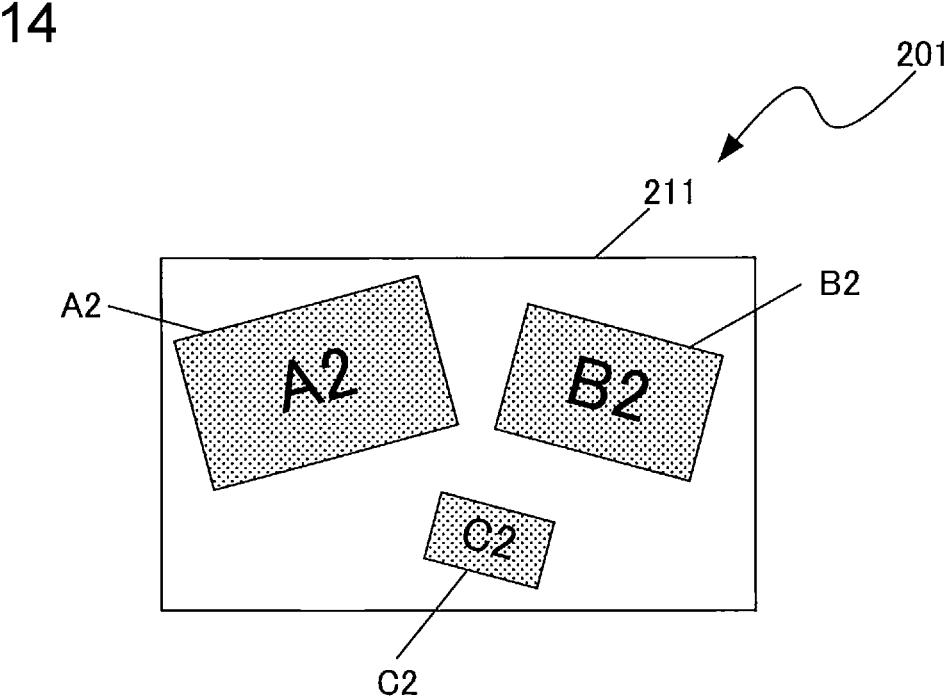
FIG. 14 is an explanatory diagram showing a state where a plurality of documents are arranged on a document table of a document reading apparatus according to a second embodiment.
Figure 15:
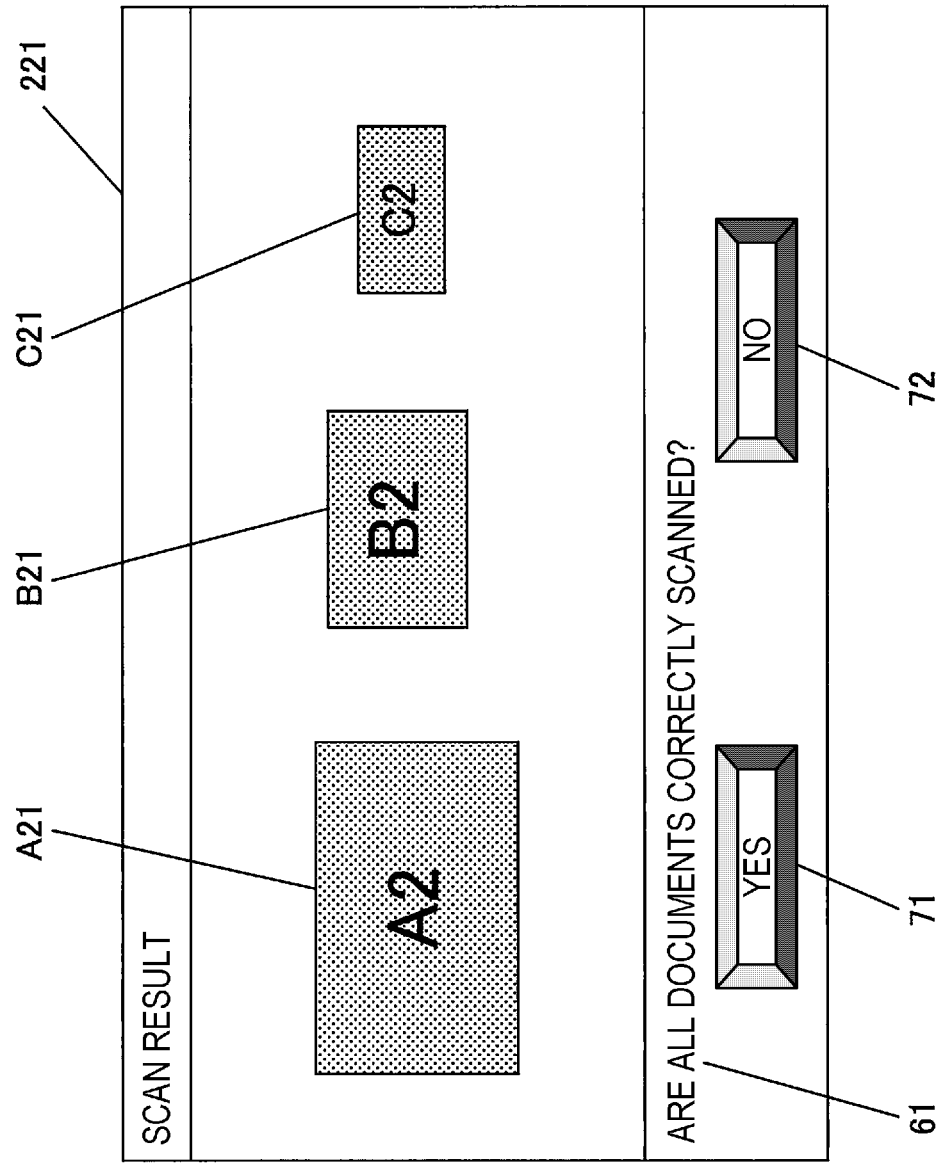
FIG. 15 is an explanatory diagram showing an example of a display screen displaying a document reading result in the document reading apparatus.

FIG. 14 is an explanatory diagram showing a state where a plurality of documents are arranged on a document table of a document reading apparatus according to the second embodiment. FIG. 15 is an explanatory diagram showing an example of a display screen displaying a document reading result in the document reading apparatus.

The document reading apparatus 201 of the second embodiment is characterized by associating the first document read information with the second document read information for each document according to a document size when the sizes of documents to be read on a document table 211 are different as shown in FIG. 14.

The documents are defined as a document A2, a document B2, and a document C2 in descending order of the document size, and a preview image is identified corresponding to a document to be read.

When documents are read by the document reading apparatus 201, as shown in FIG. 15, a display screen 221 where first preview images of the documents read for the first time is displayed is displayed on the display unit 2. On the display screen 221, first preview images A21, B21, and C21 respectively corresponding to the documents A2, B2, and C2 that are read for the first time are displayed.

As configured as described above, according to the second embodiment, in the document reading apparatus 201, when the sizes of documents to be read are different, it is possible to identify a preview image where the first document read image and the second document read image are associated with each other for each document by associating the first document read information with the second document read information for each document according to a document size.

Third Embodiment

Next, a third embodiment will be described with reference to the drawings.

For convenience of description, components having the same functions as those in the first embodiment are denoted by the same reference numerals and the description thereof will be omitted.

Figure 16:
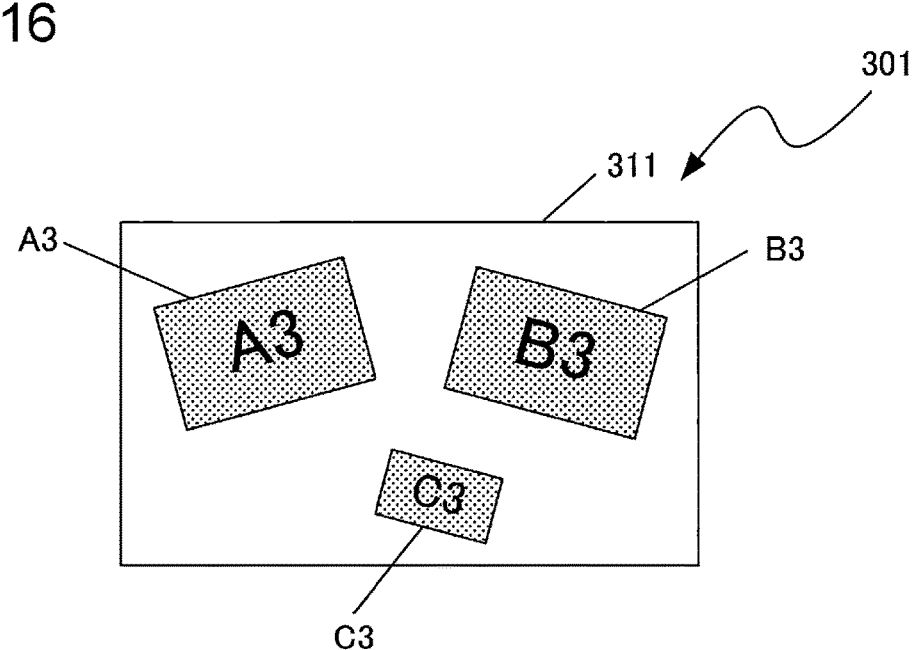
FIG. 16 is an explanatory diagram showing a state where a plurality of documents are arranged on a document table of a document reading apparatus according to a third embodiment.
Figure 17:
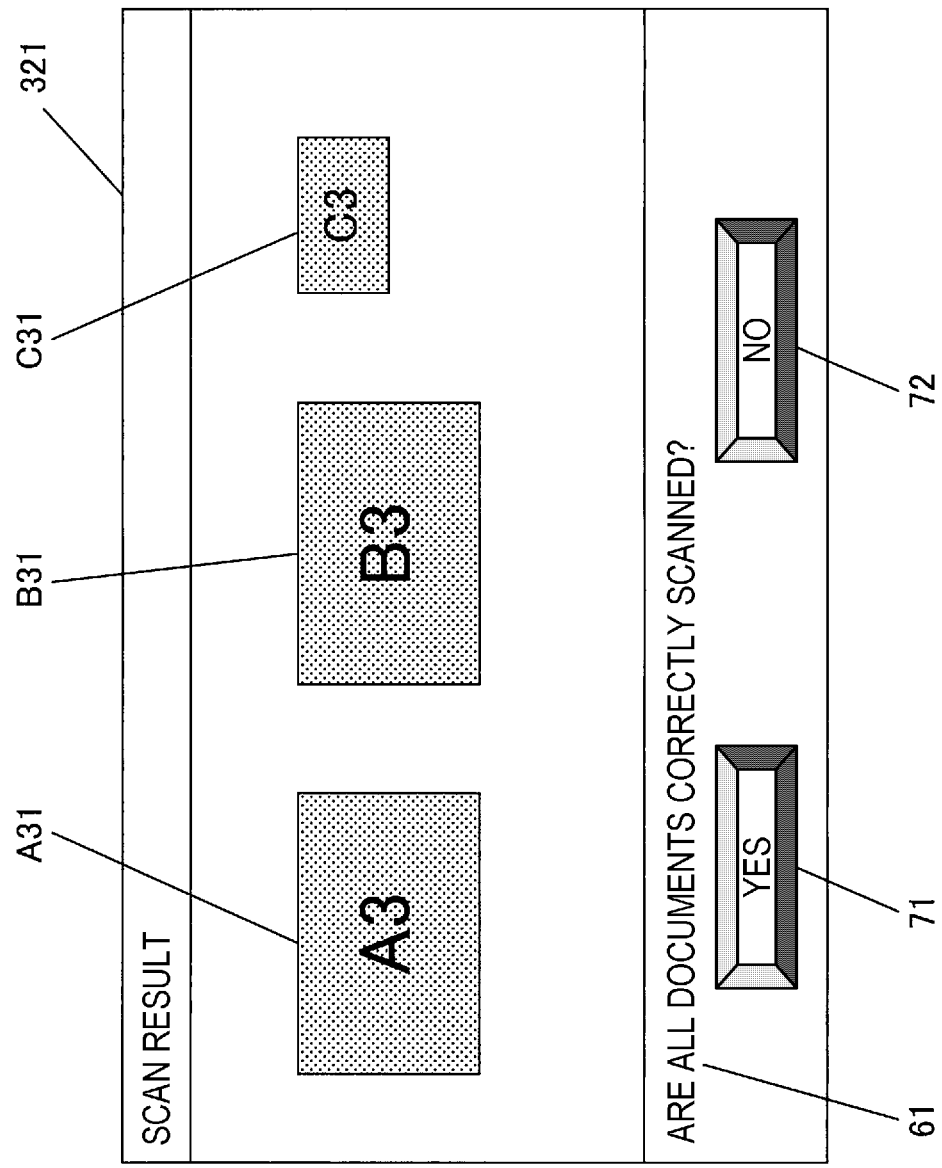
FIG. 17 is an explanatory diagram showing an example of a display screen displaying a document reading result in the document reading apparatus.

FIG. 16 is an explanatory diagram showing a state where a plurality of documents are arranged on a document table of a document reading apparatus according to a third embodiment. FIG. 17 is an explanatory diagram showing an example of a display screen displaying a document reading result in the document reading apparatus.

When documents to be read on a document table 311 have regular sizes as shown in FIG. 16, the document reading apparatus 301 of the third embodiment is characterized by associating the first document read information with the second document read information for each document according to size information of the document.

When documents arranged adjacent to each other have the same regular size, the first document read information and the second document read information of a document, which are adjacent to each other, may be associated with each other. The documents are defined as a document A3, a document B3, and a document C3 in descending order of the regular size, and a preview image is identified corresponding to a document to be read.

When documents are read by the document reading apparatus 301, as shown in FIG. 17, a display screen 321 where first preview images of the documents read for the first time is displayed is displayed on the display unit 2. On the display screen 321, first preview images A31, B31, and C31 respectively corresponding to the documents A3, B3, and C3 that are read for the first time are displayed.

As configured as described above, according to the third embodiment, in the document reading apparatus 301, when the documents to be read have regular sizes, it is possible to identify a preview image where the first document read image and the second document read image are associated with each other for each document by associating the first document read information with the second document read information for each document according to size information of the document.

Fourth Embodiment

Next, a fourth embodiment will be described with reference to the drawings.

For convenience of description, components having the same functions as those in the first embodiment are denoted by the same reference numerals and the description thereof will be omitted.

FIG. 18 is a block diagram showing a configuration of a document reading apparatus according to the fourth embodiment.

The document reading apparatus 401 according to the fourth embodiment has a configuration similar to that of the document reading apparatus 1 of the first embodiment and is characterized by including a voice output unit (voice output device) 406 as a notification device in addition to the display unit 2, the document reading unit 3, the image generation unit 4, the image switching unit 5, the storage unit 8, and the control unit 9, which are main components.

When there is an unreadable document, the voice output unit 406 notifies accordingly with a voice.

In this way, according to the fourth embodiment, the document reading apparatus 401 includes the voice output unit 406 as a notification device, so that when there is an unreadable document in the documents to be read, a user can know that there is an unreadable document by voice without checking a display screen.

In the embodiments described above, an association between the first document read information and the second document read information is performed for each document read by the document reading apparatus by using the document set position information or the document size. However, the association may be performed based on an information amount of document read information, a type of read information (image information, character information, and the like), color information of the document, material of the document, and the like.

As described above, the present disclosure is not limited to the embodiments described above, but can be variously modified within the scope of the claims. It is obvious that those skilled in the art can make various changes or modifications of the embodiments within the scope of the claims. Specifically, an embodiment obtained by combining technical devices that are appropriately changed without departing from the scope of the present disclosure is also included in the technical scope of the present disclosure.

The present disclosure contains subject matter related to that disclosed in Japanese Priority Patent Application JP 2017-238888 filed in the Japan Patent Office on Dec. 13, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A document reading apparatus comprising:
a document reading unit that reads a document;
an image generation unit that generates a preview image based on document read information acquired by the document reading unit; and
a display unit that can display the preview image,
wherein the document reading unit
has a function to read a plurality of documents by one time reading operation, and
acquires first document read information obtained by reading the document in a state where a document pressing member is opened and second document read information obtained by reading the document in a state where the document pressing member is closed for each document, and
the image generation unit
generates a preview image corresponding to each document based on the first document read information and the second document read information.

2. The document reading apparatus according to claim 1, wherein the document reading apparatus can associate the first document read information with the second document read information for each document and selectively display a preview image based on the first document read information or the second document read information on the display unit.

3. The document reading apparatus according to claim 1, further comprising: a display information switching switch that selectively displays a preview image based on the first document read information or the second document read information on the display unit.

4. The document reading apparatus according to claim 2, wherein the document reading apparatus associates the first document read information with the second document read information for each document based on set position information of the document.

5. The document reading apparatus according to claim 2, wherein when sizes of the documents are different, the document reading apparatus associates the first document read information with the second document read information for each document according to a document size.

6. The document reading apparatus according to claim 2, wherein when the documents have regular sizes, the document reading apparatus associates the first document read information with the second document read information for each document according to size information of the document.

7. The document reading apparatus according to claim 2, wherein the document reading apparatus associates the first document read information with the second document read information for each document according to color information of the document.

8. The document reading apparatus according to claim 2, wherein the document reading apparatus associates the first document read information with the second document read information for each document according to a read information amount of the document.

9. The document reading apparatus according to claim 1, wherein when the document cannot be read, notification processing is performed that notifies that the document cannot be read.

10. The document reading apparatus according to claim 9, wherein the notification processing displays that the document cannot be read on the display unit.

11. The document reading apparatus according to claim 9, wherein the notification processing notifies that the document cannot be read by using a voice output device.

* * * * *